(12) United States Patent
Olsen, III et al.

(10) Patent No.: US 10,318,912 B2
(45) Date of Patent: Jun. 11, 2019

(54) AUTONOMOUS COMMUNICATION IN SHIPPING

(75) Inventors: John A. Olsen, III, Cumming, GA (US); David L. Bradley, Alpharetta, GA (US); Rhesa M. Jenkins, Atlanta, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 77 days.

(21) Appl. No.: 13/188,309

(22) Filed: Jul. 21, 2011

(65) Prior Publication Data

US 2011/0320377 A1    Dec. 29, 2011

Related U.S. Application Data

(63) Continuation of application No. 10/842,907, filed on May 10, 2004, now abandoned.

(51) Int. Cl.
| | |
|---|---|
| *G06Q 10/00* | (2012.01) |
| *G06Q 30/00* | (2012.01) |
| *G06Q 10/08* | (2012.01) |
| G06F 19/00 | (2018.01) |
| G06F 17/30 | (2006.01) |
| G07B 17/00 | (2006.01) |
| G06F 16/00 | (2019.01) |

(52) U.S. Cl.
CPC .......... *G06Q 10/08* (2013.01); *G06Q 10/083* (2013.01); *G06Q 10/0835* (2013.01); *G06Q 10/0836* (2013.01); *G06F 16/00* (2019.01); *G06F 17/30* (2013.01); *G06F 19/00* (2013.01); *G06Q 10/0833* (2013.01); *G07B 2017/00379* (2013.01)

(58) Field of Classification Search
CPC .. G06Q 10/08; G06Q 10/083; G06Q 10/0832; G06Q 10/0833; G06Q 10/0835; G06Q 10/0836
USPC ................. 705/1.1, 330, 336, 339, 500, 332
See application file for complete search history.

(56) References Cited

U.S. PATENT DOCUMENTS

| | | | |
|---|---|---|---|
| 5,444,444 A | 8/1995 | Ross | |
| 5,648,770 A | 7/1997 | Ross | |
| 5,831,860 A | 11/1998 | Foladare et al. | |
| 5,912,628 A * | 6/1999 | Jeong | ............................ 340/2.4 |

(Continued)

OTHER PUBLICATIONS

European Patent Office, Office Action for European Application No. 05732371.9, dated Jul. 13, 2012, 5 pages, The Netherlands.
(Continued)

*Primary Examiner* — Patrick McAtee
*Assistant Examiner* — Shaun D Sensenig
(74) *Attorney, Agent, or Firm* — Shook, Hardy & Bacon L.L.P.

(57) ABSTRACT

The invention provides a system and method for the autonomous wireless communication between a service provider device and a customer device. The customer device may notify the service provider device whether the customer has work to be performed by the service provider. The service provider device may provide information to the customer about work to be performed by the service provider. In one embodiment, a shipping service is notified autonomously about items that a customer has for pick up and shipment. The shipping service is also capable of wirelessly transferring information to a customer device about items to be delivered to that customer.

20 Claims, 10 Drawing Sheets

(56) References Cited

U.S. PATENT DOCUMENTS

| | | | | |
|---|---|---|---|---|
| 6,124,800 | A | * | 9/2000 | Beard et al. ............ 340/5.9 |
| 7,458,612 | B1 | * | 12/2008 | Bennett ............ 283/81 |
| 2002/0184331 | A1 | | 12/2002 | Blight et al. |
| 2003/0041238 | A1 | * | 2/2003 | French et al. ............ 713/153 |
| 2003/0114206 | A1 | | 6/2003 | Timothy et al. |
| 2003/0139136 | A1 | | 7/2003 | Pattabiraman |
| 2003/0201931 | A1 | * | 10/2003 | Durst ............ G01S 5/0027 342/357.55 |
| 2003/0220835 | A1 | | 11/2003 | Barnes et al. |
| 2004/0132446 | A1 | | 7/2004 | Seedman et al. |
| 2004/0142685 | A1 | * | 7/2004 | Glasser ............ G07F 11/002 455/420 |
| 2005/0038758 | A1 | | 2/2005 | Hilbush et al. |

OTHER PUBLICATIONS

Office Action for Chinese Application No. 200580021091.6, dated Mar. 7, 2012.

State Intellectual Property Office of the People's Republic of China, Rejection Decision for Chinese Application No. 200580021091.6, dated Jun. 27, 2012, 5 pages, China.

Canadian Intellectual Property Office, Examiner Requisition for Canadian Application No. 2,566,033, dated Dec. 19, 2012, 4 pages, Canada.

United States Patent and Trademark Office, Office Action for U.S. Appl. No. 10/842,907, dated Sep. 18, 2013, 16 pages, USA.

United States Patent and Trademark Office, Office Action for U.S. Appl. No. 10/842,907, dated Jul. 7, 2014, 12 pages, USA.

European Patent Office, Summons to Attend Oral Proceeding Pursuant to Rule 115(1) EPC for Application No. 05732371.9, dated Oct. 30, 2015, 13 pages, Germany.

United States Patent and Trademark Office, Office Action for U.S. Appl. No. 10/842,907, dated Jan. 15, 2015, 12 pages, USA.

State Intellectual Property Office of the P.R.C., Notification of Reexamination for Chinese Application No. 200580021091.6, dated May 12, 2015, 12 pages, China.

Electronicstalk; "Bluetooth takes over RS232 links"; website: http://www.elctronicstalke.com/news/dii/dii101.html. Article dated Jul. 28, 2003 and accessed in Oct. 2003; two pages. Applicant makes no admission that this reference constitutes prior art.

Digi International—Marketing Device Networking Easy; Wavespeed/S product information; website: http://www.digi.com/products/usb/wavespeeds.jsp. Copyright 1996-2003 Digi International; Accessed in Oct. 2003; one page. Applicant makes no admission that this reference constitutes prior art.

Digi International—Marketing Device Networking Easy; Wavespeed/Lan product information; website: http://www.digi.com/products/usb/wavespeedlan.jsp. Copyright 1996-2003 Digi International; Accessed in Oct. 2003; one page. Applicant makes no admission that this reference constitutes prior art.

Serial Port Adapter—$2^{nd}$ Generation AT Commands; document; 2003; document version 2.0; pp. 1-49; Bluetooth; Sweden; http://www.connectblue.se; Copyright 2003 connectBlue AB; Accessed in Oct. 2003, Applicant makes no admission that this reference constitutes prior art.

What is a Mac Address; http://www.ocls.lib.fl.us/Locations/wifi_mac.asp. Accessed in Oct. 2003; three pages. Applicant makes no admission that this reference constitutes prior art.

Howstuffworks "How Bluetooth Works"; http://computer.howstuffworks.com/bluetooth.htm/printable. Copyright 1998-2003 HowStuffWorks, Inc.; Accessed in Oct. 2003; six page. Applicant makes no admission that this reference constitutes prior art.

What is Bluetooth?; http://www.palowireless.com/infotooth/whatis.asp. Accessed in Oct. 2003; two pages. Applicant makes no admission that this reference constitutes prior art.

What is Bluetooth?; http://www.mobilebluetooth.com/whatisbt.htm. Accessed in Oct. 2003; one page. Applicant makes no admission that this reference constitutes prior art.

Marconi—Glossary—B; http://www.marconi.com/html/glossaryb.htm. Accessed in Oct. 2003; one page. Applicant makes no admission that this reference constitutes prior art.

Serial Cable Replacement; four pages; Bluetooth; Sweden; http://www.connectblue.se; Copyright 2003 connectBlue AB; Accessed in Oct. 2003. Applicant makes no admission that this reference constitutes prior art.

European Search Report dated Feb. 3, 2009 for corresponding European Application No. 05 73 2371.9.

International Search Report for PCT/US05/011582, dated Nov. 20, 2007.

\* cited by examiner

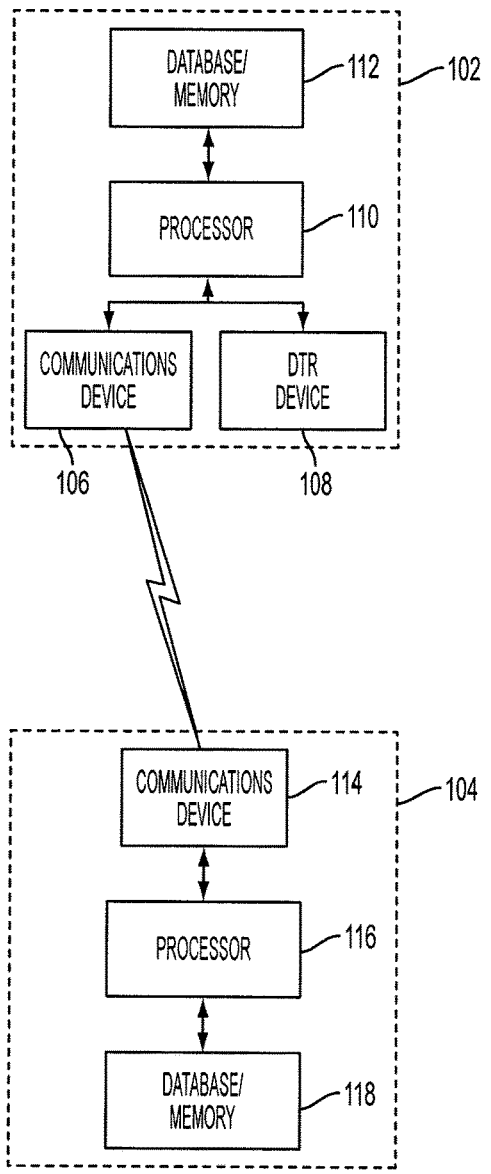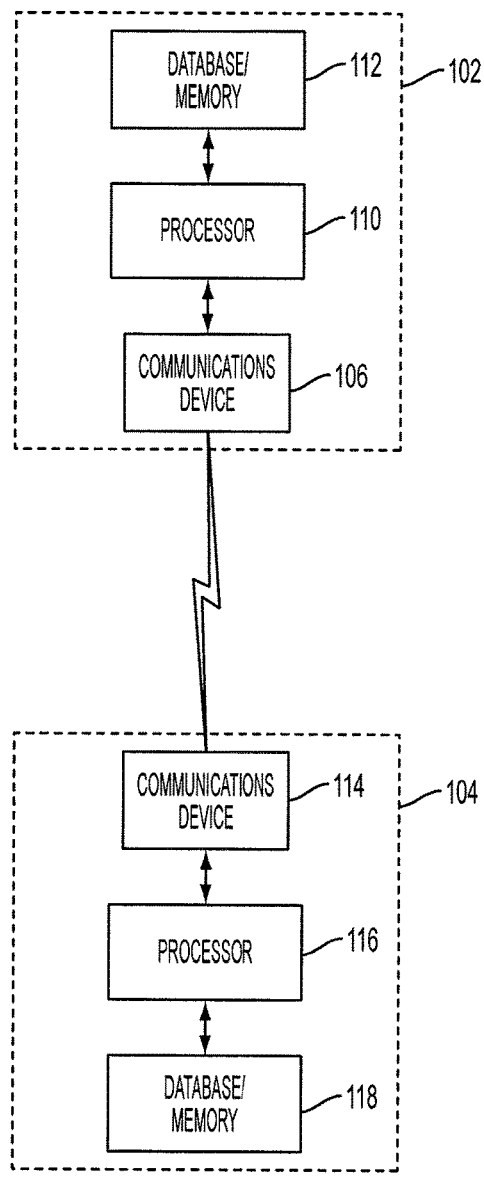

AUTONOMOUS COMMUNICATION IN SHIPPING

CROSS-REFERENCE TO RELATED APPLICATIONS

This patent application is a continuation of U.S. patent application Ser. No. 10/842,907, Filed May 10, 2004, now abandoned which is incorporated herein by reference in its entirety.

BACKGROUND OF THE INVENTION

1. Field of the Invention

The present invention generally relates to the shipment and delivery of items and more particularly relates to the use of autonomous communications in the shipment and delivery of items.

2. Description of Related Art

Generally, a service provider such as a shipping service, for example, UPS of Atlanta, Ga., has a multitude of scheduled stops in a business day for the pick-up of items to be shipped, and for the delivery of items. In many instances, the shipper at a scheduled pick-up location may not have any items to be shipped on that particular day. However, the shipping service may not be aware that there is no need to attempt a pick-up at the scheduled pick-up location. An avoidable delay may be incurred by the shipping service's personnel when making stops at these "empty" scheduled pick-up locations. Furthermore, when items are delivered to a location, customers may request shipping service personnel to relay certain information about the delivered items to the customer thereby increasing the shipping service's time per stop.

In some instances, a visual indicator may be used at a scheduled pick-up location to inform shipping service personnel whether there are items at that location to be picked-up for shipment. Such visual indicators may be in the form of a sign placed in the window or door of the scheduled pick-up location. However, this approach is not practical in many instances because the pick-up location may not have exterior windows or doors where the visual indicator may be placed. In other instances, the windows may be at an elevation where the visual indicator cannot be seen from the street by shipping service personnel.

The embodiments of the present invention overcome many of the challenges encountered in the prior art, some of which are described above, by providing efficient methods and systems to notify service provider personnel whether or not there is work to be performed at a customer's location and to quickly and efficiently transfer information from the service provider to the customer.

BRIEF SUMMARY OF THE INVENTION

Embodiments of the present invention include systems and methods of a service provider's device having communications with a customer's device. More specifically, the embodiments of the present invention include systems and methods of a shipping service's device having autonomous communications with a shipper's device. In one embodiment of the invention, a Delivery Information Acquisition Device (DIAD), as used by UPS of Atlanta, Ga., has autonomous contact with a shipper's personal computer or other processor-based device having a unique network address or wireless access address. In one embodiment, the unique address is a MAC address. A MAC address is a unique identifier burned into Ethernet™ and token ring adapters that identify that device's network interface from all others. In other embodiments, the unique address may be an Internet protocol (IP) address, as are known in the art, or other means of individually identifying customers' devices.

A shipping service provider such as, for example, UPS, has on the average, 1.3 million pick-ups a day (situations where UPS has agreed to stop and see if a customer has anything to be picked up). The embodiments of the present invention prevent the shipping service provider's driver from having to walk from the driver's truck to the customer's location to inquire if the customer has anything for pick up. For example, a driver may walk into an office building's lobby and the DIAD autonomously communicates with one or more different customers' devices on different floors to see which customers have work for the driver and to transfer information to the customer's device. In one embodiment of the invention, a wireless personal area network (WPAN) such as, for example, a Bluetooth™ network (IEEE 802.15.1 standard compatible) is used to transfer information between the service provider's device and the customer's device. In other embodiments, WPANs compatible with the IEEE 802 family of standards are used.

One aspect of the invention is to use a WPAN signal to measure the signal strength between two devices such as, for example, the service provider's device and the customer's device, to determine whether the two devices are within data transmission range.

Another aspect of the invention is a system comprised of a service provider's device having a communications device capable of communicating with customers' devices and a database with an address of customers' devices, a customer's device having a communications device capable of communicating with the service provider's device.

Another aspect of the invention is for the service provider's device to autonomously poll the customer's device to determine if the customer has any work for the service provider.

Another aspect of the invention is for the shipping service's device to autonomously poll the customer's device to determine if the customer has any items to be shipped.

Another aspect of the invention is for the service provider's device to transfer information to the customer's device.

Another aspect of the invention is for the shipping service's device to transfer information to the customer's device about items to be delivered to the customer.

Another aspect of the invention is to use a WPAN signal to determine the signal strength between a shipping service's device and a customer's device and to transfer item information between the devices if within a suitable data range.

Another aspect of the invention is associating in a database location information that indicates a location of at least one customer's premises with at least one wireless access address for a wirelessly-enabled computing device at the customer's premises.

In one aspect of the invention, the location information comprises at least a portion of a street address.

In another aspect of the invention, the location information comprises global positioning system (GPS) coordinates.

In other aspects of the invention, the wireless access address is a MAC address, or the wireless access address is an Internet Protocol address.

Another aspect of the invention is wirelessly transmitting location information from a computing device to a database storage unit storing location information for a plurality of customer locations. Respective wireless access addresses of the respective wirelessly-enabled computing devices at the customer locations is also transmitted to the database storage unit. The wireless access address associated with the transmitted location data is retrieved from the database storage unit and is transmitted to the computing device, where it is received. The wireless access address is then wirelessly transmitted to at least one customer computing device at the customer location to determine whether an item is available to be picked up for shipment at the customer's location. The location information may be comprised of at least a portion of a street address, or global positioning system (GPS) coordinates. The wireless access address may be a MAC address, or an Internet Protocol address.

These and other aspects of the invention are more fully described herein.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1D is one exemplary embodiment of the system of the invention for autonomous point-to-point communication between a service provider device and a customer device;

FIG. 1E is another exemplary embodiment of the system of the invention for autonomous point-to-point communication between a service provider device and a customer device, which is further comprised of a DTR device;

Figure 7:
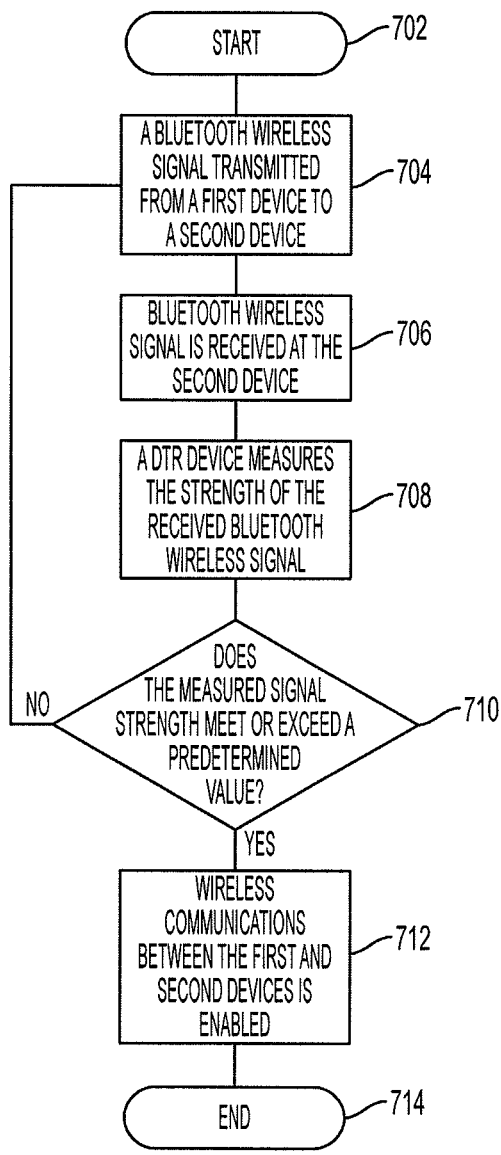
Figure 8:
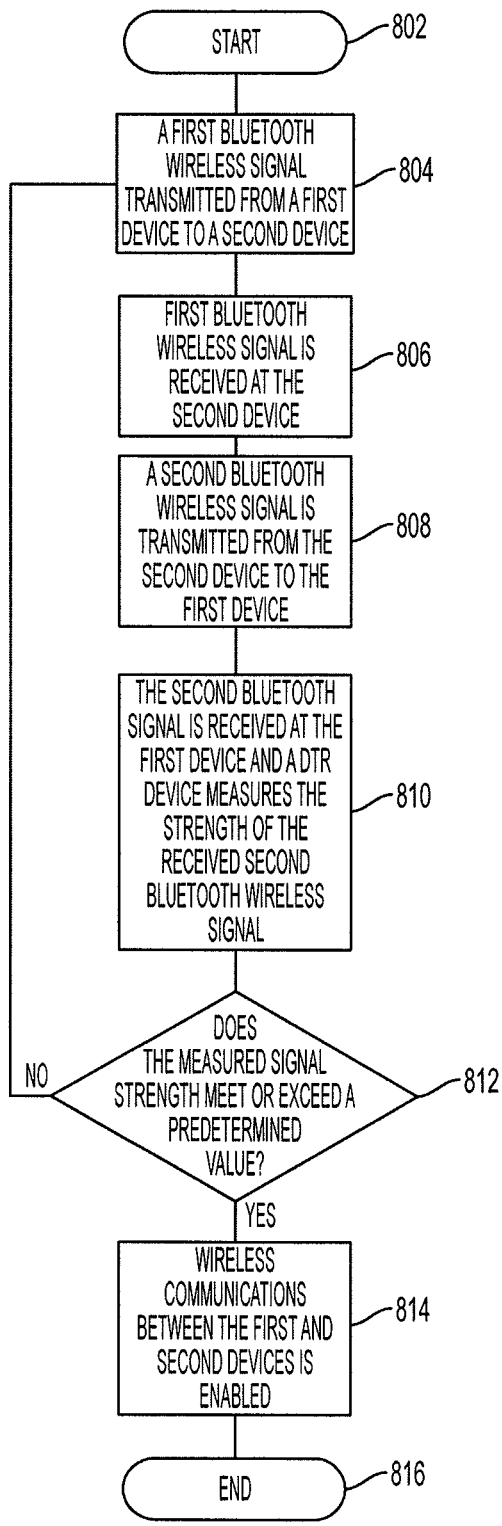

FIG. 7 is a flowchart that describes an exemplary method to measure the signal strength between two communications devices to determine if the devices are within data transmission range in an embodiment of the invention; and FIG. 8 is another embodiment of a flowchart that describes an exemplary method to measure the signal strength between two communications devices to determine if the devices are within data transmission range in an embodiment of the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The embodiments of the present invention may be described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Embodiments of the present invention include systems and methods of a service provider's device having autonomous communications with a customer's device. More specifically, in one embodiment of the invention, a Delivery Information Acquisition Device (DIAD), as used by UPS of Atlanta, Ga., has autonomous contact with a shipper's computer or other device having a unique network address or wireless access address. In one embodiment, the unique address is a specific MAC address. In other embodiments, the unique address may be a serial number of the computer or device's CPU or of the computer itself, a hash of the serial numbers of various components of a computer, an IP address, etc.

Considering an example where a MAC address is used as the unique address of the customer's computer or other device, a communications link is established between a customer's device and a service provider's device. The service provider's device is programmed for the unique address such as, for example, the specific MAC addresses at a stop location. Upon approaching the location, signals are sent from a communications device within the service provider's device to each customer's device. The signals are addressed to the specific unique address of the customers' devices at the stop location. These unique addresses such as, for example, MAC addresses are stored in a memory of the service provider's device. An operator of the service provider's device selects a location and the service provider's device will then send signals addressed to the MAC addresses of the customers' devices at that location. If a signal reaches a customer's device having a corresponding MAC address, software within the customer's device enables the customer's device having the specific MAC address to send a signal to the service provider's device informing the service provider whether that customer does, or does not, have need for the service provider's assistance.

A MAC address is a unique number assigned to a network interface such as, for example, a network interface card (NIC). These network interfaces are used in networks such as, for example, Ethernet™ and token ring networks. A NIC may also be called an Ethernet™ card. The MAC "address" is created by the manufacturer of the interface device. A standard MAC address is generally comprised of 12 alphanumeric characters. Each character is a number from 0-9 or a letter from A-F (i.e., a hexadecimal number). Sometimes colons or dashes separate the characters of a MAC address. Examples of possible MAC addresses include: 34528CF3D0B8, 34:52:8C:F3:D0:B8, 34-52-8C-F3-D0-B8, etc. In other embodiments, various unique identifiers other than MAC addresses may be used to identify a customer's computer or other device.

In one embodiment, a WPAN is supported by the communications link between the service provider's devices and the customers' devices. The supported WPAN includes a Bluetooth™ wireless protocol.

In one embodiment, the service provider's device is a DIAD such as a DIAD IV that is equipped with Bluetooth™ communications device. A customer's device (e.g., a personal computer) also has Bluetooth™ communications device. In one embodiment, the customer's device is a Bluetooth™ enabled communications device adapter that connects to the customer's device via a serial port (e.g., an RS-232 connection) or to a USB port via a device such as a Bluetooth-enabled USB dongle. The Bluetooth™ enabled communications device may be equipped with a special board to enable it to measure signal strength. Such boards are available from, for example, "Wavespeed" by Digi International of Minnetonka, Minn., or connectblue AB of Malmö, Sweden.

The Wavespeed/S wireless serial adapters offer a secure, standards-based solution to enable wireless RS-232 serial data transfer between peripheral devices and a host. Two Wavespeed/S units may be paired with a host PC and barcode scanner, receipt printer, scale or other device to create a wireless link for instant serial cable replacement. A single Wavespeed/S may be used in server mode to communicate with a Bluetooth-enabled serial device like a DIAD, PDA, PLC, tablet PC or WAN radio. Generally, the Wavespeed/S wireless serial adapters connect to any serial port—no host PC or application software is required. Wavespeed/S increases user mobility in applications such as, for example, mobile computing (emergency vehicles, delivery trucks), medical, point-of-sale, etc.

While present versions of Bluetooth™ enabled communications devices do not have inherent signal strength measurement capabilities, thus necessitating the special boards to measure signal strength, it is anticipated that future versions of Bluetooth™ enabled communications devices will have intrinsic signal strength measurement capabilities. Therefore, the embodiments of this invention encompass this anticipated enhancement to Bluetooth™ technology communications.

Bluetooth™ technology is chip technology that enables seamless voice and data connections between a wide range of devices through short-range digital two-way radio. It is an open specification for short-range communications of data and voice between both mobile and stationary devices. For instance, it specifies how mobile phones, wireless information devices (WIDs), computers and PDAs interconnect with each other, with computers, and with office or home phones. Bluetooth™ technology is a result of an alliance between mobile communications and mobile computing companies to develop a short-range communications standard allowing wireless data communications at ranges of about 10 meters. Bluetooth™ technology encompasses both a standard communications interface and a low-cost computer chip. It is a cross between the DECT (Digital European Cordless Telephone) and iRDA (infra Red Data Association) technologies, though the direct line of sight requirements of iRDA are avoided.

Bluetooth technology does not involve mobile network transactions, its spectrum is freely available to use in the unlicensed spectrum area (at about 2.45 gigahertz). Data transmission speeds using Bluetooth™ enabled devices are now approximately between 720 kbps and one megabit per second (Mbps). Bluetooth™ technology will facilitate wireless local area networks (LANs) in which networks of different handheld computing terminals and mobile terminals can communicate and exchange data, even on the move and when there is no line-of-sight between those terminals. The synchronization and exchange of data are the major applications of Bluetooth™ enabled devices, as are electronic commerce applications such as, for example, electronically paying for parking meters, bus tickets, shopping, movies and so on. Bluetooth™ technology runs in the background and line of sight is not even needed for the machines to automatically initiate and trigger processes. The Bluetooth™ standard incorporates control mechanisms, since each device is assigned a unique address (e.g., 12-byte (MAC)), and to connect to that device, its address must be known. There is also an enquiry feature to search for other Bluetooth™ enabled devices within range.

In one embodiment of the invention, a signal produced by Bluetooth™ enabled devices is used to measure the signal strength between two devices to determine whether the two devices are within data transmission range (DTR). In other embodiments communications between the two devices is attempted without measuring signal strength. In one embodiment, the two devices are a DIAD (such as a DIAD IV) and one or more customers' computers. The customers' computers are equipped with Bluetooth™ communications devices having network interfaces such as NICs, each with separate MAC addresses. A DIAD equipped with a Bluetooth™ communication's device is programmed with the unique addresses (e.g., MAC addresses) of customer's computers' NICs. In an embodiment wherein signal strength between two Bluetooth™ enabled devices (e.g., a DIAD and a customer device) is measured to determine DTR, as a service provider carries a DIAD into a designated area the DIAD is programmed to know the unique addresses (e.g., MAC addresses, IP addresses, etc.) that are in the area and begins monitoring the signal strength between the DIAD and the customers' computers with a DTR device. Once a sufficient signal strength is established between a DIAD and a customer's computer, the DTR device provides a set bit of "1" to the communications device, which allows communications to be established between the DIAD and the customer's computer. When the DTR strength shows that a connection is established, the DIAD downloads shipping information and receives an acknowledgment. A DIAD may also communicate to a customer's device that the customer has, for example, a COD package and the customer needs to provide payment to the service provider. Furthermore, the DIAD may receive information from the customer's device indicating that the customer has items to be picked up by the service provider for shipment.

A computer program associated with the customer's device may provide the customer with the option to request a pick up or other work. The DIAD will autonomously check the customer's device. The computer program will cause the communications device of the customer's device to transmit a signal to the service provider's device thereby instructing the service provider to go to that customer's location. Alternatively, the DIAD may receive from the customer's device a signal that there is no work at a particular customer site or the DIAD may not receive a signal from the customer's device. Therefore, the service provider knows whether there is a need to perform work at the customer's location without having to shut off the service provider's vehicle and/or leave the vehicle. If there is a need for work at a customer's location, the service provider can be better prepared for the specific work to be performed at the customer's location such as, for example, by having the necessary labels, carts, etc. for parcels, or in other instances, by taking the proper tools, equipment or parts to the customer's location.

Figure 1A:
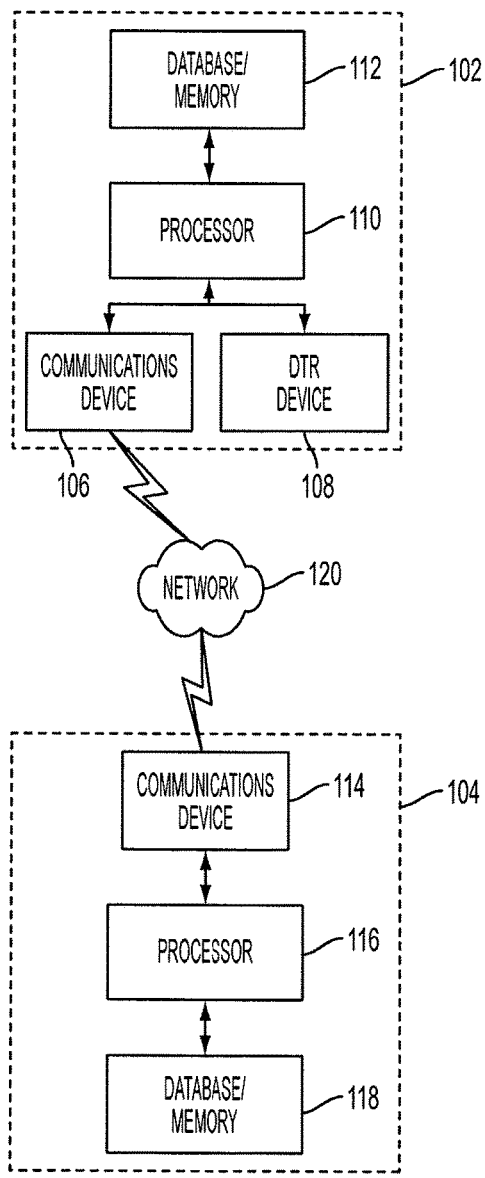
FIG. 1A is one exemplary embodiment of the system of the invention for autonomous communication between a service provider device and a customer device.

FIG. 1A illustrates one embodiment of the system of the invention for autonomous communication. In this embodiment, a service provider device 102 and a customer device 104 are provided. Communications between the devices 102, 104 occurs via a wireless network 120. As previously described, the service provider device 102 may be, for example, a DIAD as employed by UPS, or it may be a personal digital assistant (PDA), WID, or other communications device having processing capability. The customer device 104 may be a personal computer, server, microprocessor, or other device capable of causing the transmission of communications signals and processing received signals. The service provider device 102 is further comprised of a communications device 106, such as, for example, a Bluetooth™ enabled wireless transceiver, and a DTR device 108. A processor 110, capable of executing instructions, communicates with the communications device 106, the DTR device 108 and one or more databases 112 stored in a memory device.

The customer device 104 is further comprised of a communications device 114, such as, for example, a Bluetooth-enabled wireless transceiver. The customer device 104 also has a processor 116 capable of executing instructions and communicating with the communications device 114 and one or more databases 118 stored in a memory device.

The service provider device 102 communicates over the network 120 with the customer device 104 via the respective communications devices 106, 114. Generally, this is accomplished by the communications device 106 of the service provider device 102 sending a signal having a specific MAC address to a customer device 104 having that specific MAC address. Once this signal is received by the customer device 104 having that particular MAC address, the two devices may communicate. In other embodiments unique addressing schemes other than MAC addressing may be used.

In one embodiment, as shown in FIG. 1A, the service provider device 102 includes a DTR device 108. This device measures the signal strength of a test communications signal between the customer device 104 and the service provider device 102. Once this test communications signal meets or exceeds a predetermined level, a bit is set in the processor 110 of the service provider device 102 thereby allowing the transfer and receipt of data between the service provider device 102 and the customer device 104 via their respective communications devices 106, 114. In various embodiments, the DTR device 108 may be a separate electronic board or chip from the Bluetooth™ enabled wireless transceiver, whereas in other embodiments the DTR device 108 may be incorporated into the electronic board, circuits or chips of the Bluetooth™ enabled wireless transceiver.

Figure 1B:
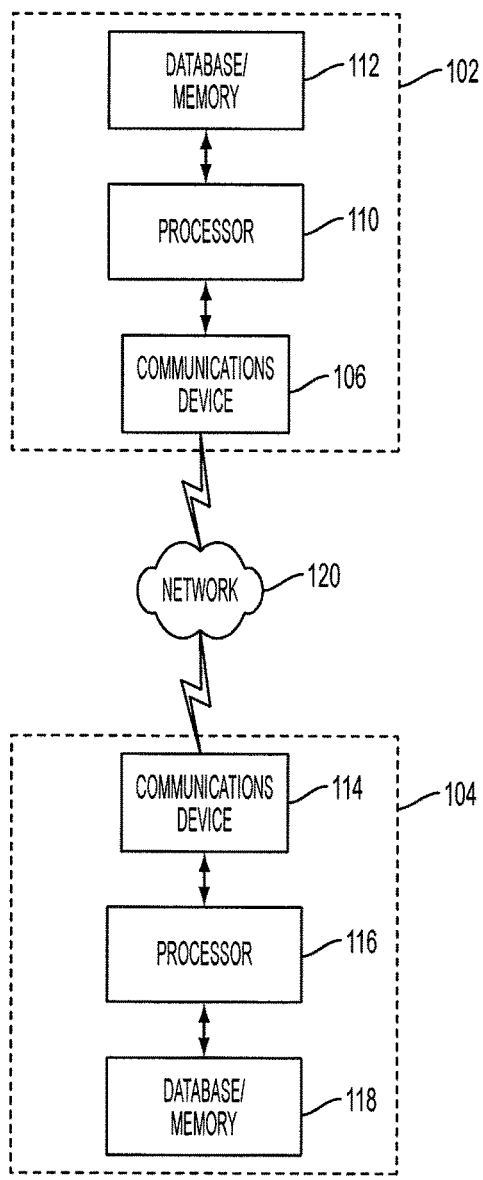
FIG. 1B is another exemplary embodiment of the system of the invention for autonomous communication between a service provider device and a customer device, which is further comprised of a DTR device.

In another embodiment, as shown in FIG. 1B, the service provider device 102 does not include a DTR device 108. In such an embodiment, communications is established by selecting a location from the memory of the service provider device 102, wherein the location is associated with one or MAC addresses of customers' devices 104. The communications device 106 of the service provider device 102 then sends a signal having a specific unique address such as, for example, a MAC address to a customer device 104 having that specific address. Once this signal is received by the customer device 104 having that particular address, the customer device 104 will send an acknowledgment signal to the service provider device 102. Once the acknowledgment signal is received by the service provider device 102, the two devices may communicate and transfer information from one to another.

Figure 1C:
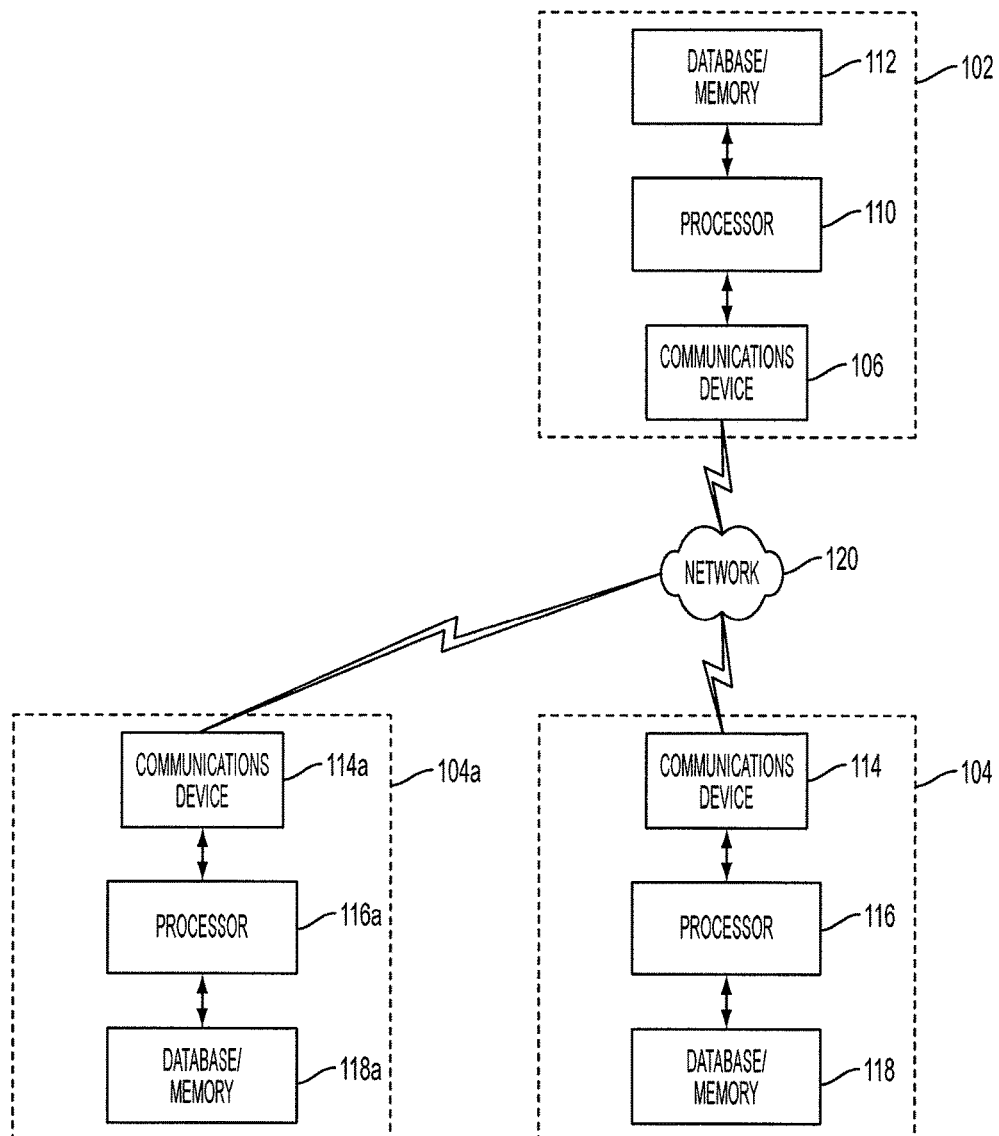
FIG. 1C is another exemplary embodiment of the system of the invention for autonomous communication between a service provider device and one or more customer devices that are connected to a network.

In one embodiment, the network 120 is designed to support a WPAN protocol, which includes a Bluetooth™ wireless protocol, although other wireless fidelity protocols such as wireless wide area network (WWAN), and wireless local area network (WLAN), may be supported in other embodiments. Furthermore, in one embodiment as shown in FIG. 1C, a service provider device 102 may be able to communicate with one or more customer devices 104 that are connected to a network 120. The network 120 that may be wired, wireless or a combination thereof. In one embodiment (not shown), the service provider device 102 may communicate with one master device (e.g., server, router, etc.) that is connected to the network. The master device may then communicate with other customer devices that are connected to the network. In other embodiments of the invention, as shown in FIGS. 1D and 1E, communications between the service provider device 102 and the customer device 104 are point-to-point.

Figure 2:
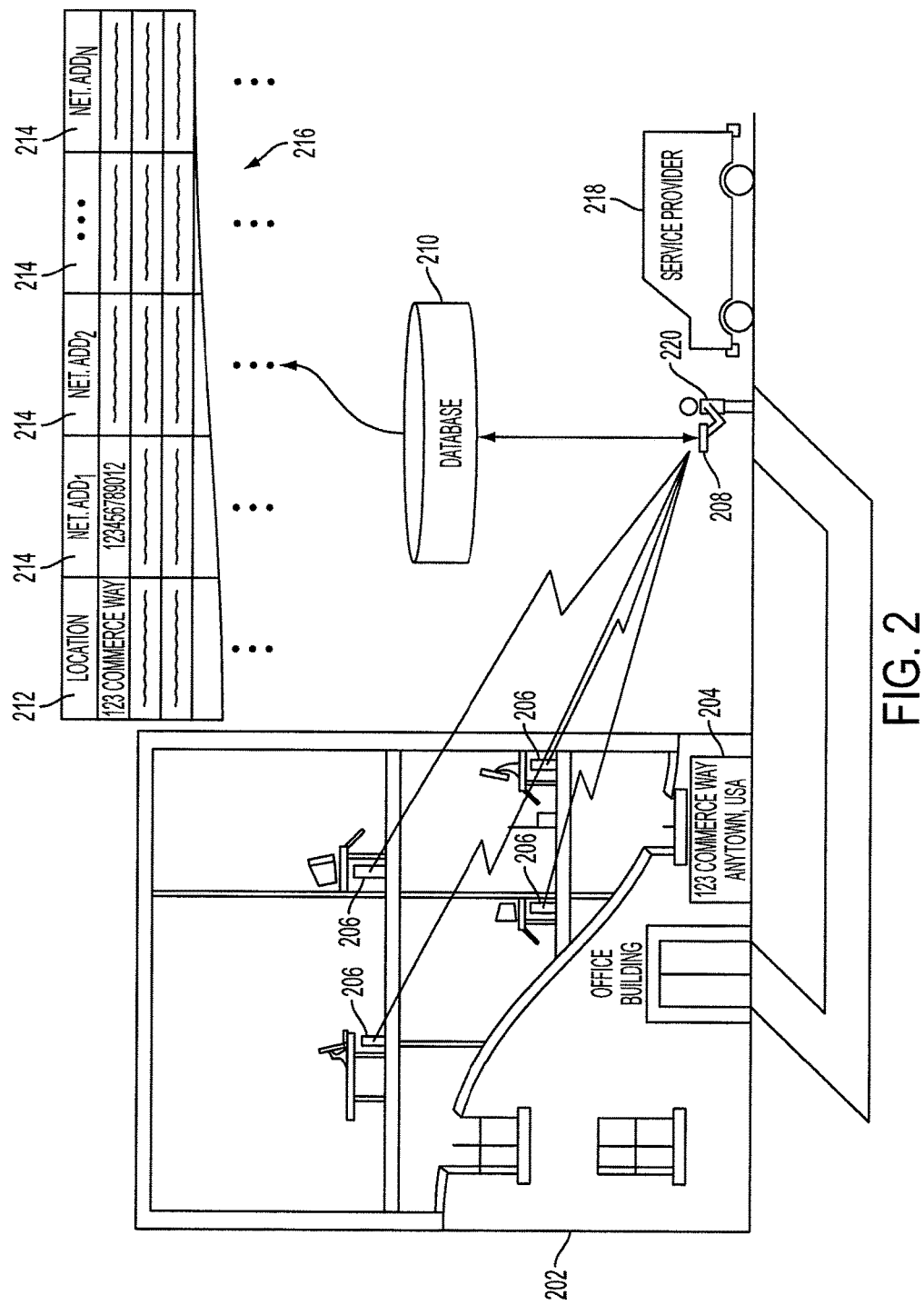
FIG. 2 is an exemplary illustration of the use of an embodiment of the system of the invention for communications between a service provider device and various customer devices.

The database 112 of the service provider device 102 includes information about locations and the unique addresses of customer devices associated with those locations. For instance, and as shown in FIG. 2, an office building 202 having a specific address 204 may have numerous devices 206 having unique addresses associated with that one location 202. The service provider's device 208 contains a database 210 that associates location information

212 with unique network addresses or wireless access addresses 214 at those locations. An exemplary structure of such a database 216 is shown in FIG. 2.

In one embodiment, a service provider will select a location from the database by, for example, pressing a button (not shown) on the service provider device 102, selecting a location from a menu, scanning a barcode, RFID tag, or some other machine-readable indicia that identifies a location, by receiving a signal from a transmitter at the location wherein the signal provides information identifying the location, or by receiving global positioning system information.

Referring now to FIGS. 1A and 2, the service provider device's processor 110 will cause a signal to be sent from the Bluetooth™ enabled communications device 106 of the service provider device 208 to each unique address of customer devices 206 associated with that specific location 202. A response (acknowledgment) is sent by the communications device 114 of the customer device 104, 206 if the signal is received. If so equipped, the DTR device 108 measures the strength of these signals and, if the signals are sufficiently strong and meet a certain threshold, the DTR device 108 enables the transfer of data between the devices 208, 206. In other embodiments not equipped with a DTR device 108, data transfer may be enabled simply by the receipt of the acknowledgment by the service provider device 208 from the customer device 206.

As shown in the embodiment of FIG. 2, the service provider may determine, by use of the service provider device 208, from the customer devices 206 located within the building 202 whether the customers have any work for the service provider, without having to enter the building 202. Although in the embodiment shown in FIG. 2 the service provider's personnel 220 has exited the vehicle 218, it is not necessary that the service provider device 208 be located outside the vehicle 218 and in some instances, the service provider device 208 may be mounted within the vehicle 218.

Figure 3:
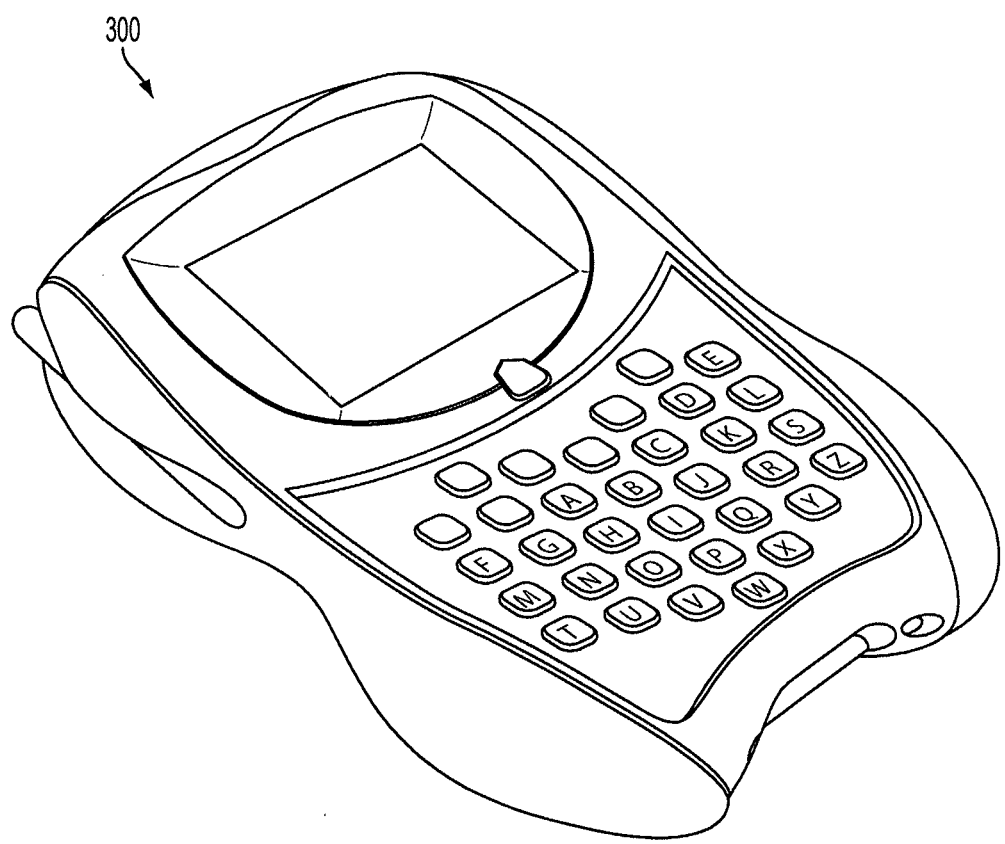
FIG. 3 is an exemplary embodiment of a service provider device that may be used in an embodiment of the system of the invention.

In one embodiment, the service provider is a shipping service such as, for example, United Parcel Service of America, Inc. of Atlanta, Ga. (UPS); FedEx Corp. of Memphis, Tenn.; etc. A driver 220 for the shipping service will have a number of designated stops to pick up and deliver parcels throughout the work day. The driver 220 carries a service provider device 208. In one embodiment, the service provider device 208 is a DIAD IV, as used by UPS. FIG. 3 is an exemplary embodiment of a DIAD IV 300, though other service provider devices may be utilized in the embodiments of the invention. Upon making a stop at a designated location, the driver 220 keys in the location 204 into the service provider device 208, selects the location 204 from a list, or otherwise enters or receives location information into the service provider device 208. In one embodiment, not shown, global positioning system (GPS) coordinates may be received by the service provider device as location information. By entering or receiving the location information into the service provider device 208, a processor in the service provider device 208 accesses a database 210 that contains one or more unique network addresses 214 or wireless access addresses associated with that location 204. Once the unique addresses 214 for that location 204 are retrieved from the database 210, the processor causes a Bluetooth™ enabled communications device within the service provider device 208 to send signals addressed to each unique address 214 associated with that location 204.

The customers' devices 206, if within range, receive the signals from the service provider's device 208. Each customer's device 206 will send an acknowledgment to the service provider's device 208 indicating to the service provider's device 208 that the signal has been received. In one embodiment, the service provider's device 208 will monitor the strength of this reply signal through the use of a DTR device 108. If the strength of the signal, as determined by the DTR device 108, indicates that the customer's device 206 and the service provider's device 208 are within data transmission range, then the DTR device 108 enables the transfer of information between the service provider's device 208 and the customer's device 206. In other embodiments, as shown in FIG. 1B, the DTR device may not be present and the transfer of information will be enabled once the reply signal is received by the service provider device 208 from the customer's device 206. In future releases of Bluetooth™ devices and software, a separate DTR device may not be necessary as the signal strength measurement function of the DTR device may be performed by the Bluetooth™ devices and/or software.

In one embodiment, a software application residing within the customer's device 206 is programmed to notify the service provider if the customer has work for the service provider by sending information via a Bluetooth signal to the service provider device 208 once communications between the customers' devices 206 and the service provider's device 208 has been established. For instance, the software application may be programmed to notify the service provider device 208 that the customer has a certain number of packages to be picked up and shipped, where the packages are to be shipped, what class of shipment (e.g. next-day delivery, second-day delivery, regular shipping, etc.), and other pertinent shipping information. The software application may also notify the service provider device that the customer has no items or parcels for pick-up or shipment and, therefore, the service provider does not need to visit that office or location.

In one embodiment, the service provider device transfers information from the service provider's device 208 to a customer's device 206. Such information may pertain to, for example, parcels to be delivered to the customer and may include information such as the number of parcels and who they are from, where the parcels were shipped from, any fees due, etc.

Figure 4:
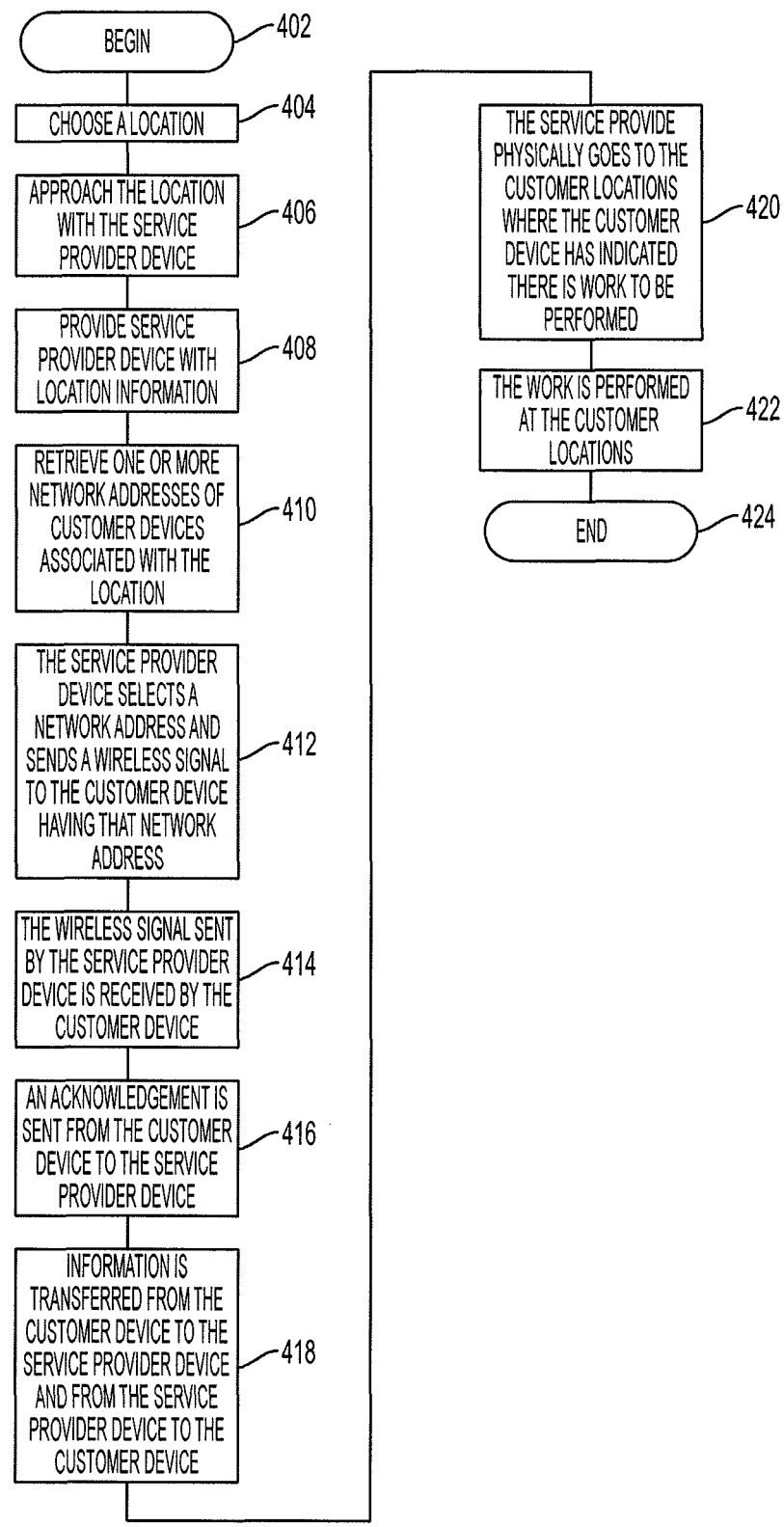
FIG. 4 is a flowchart describing an exemplary method of use of one or more embodiments of the system of the invention, wherein a service provider device is autonomously provided information by a customer device about work to be performed at the customer's location.
Figure 5:
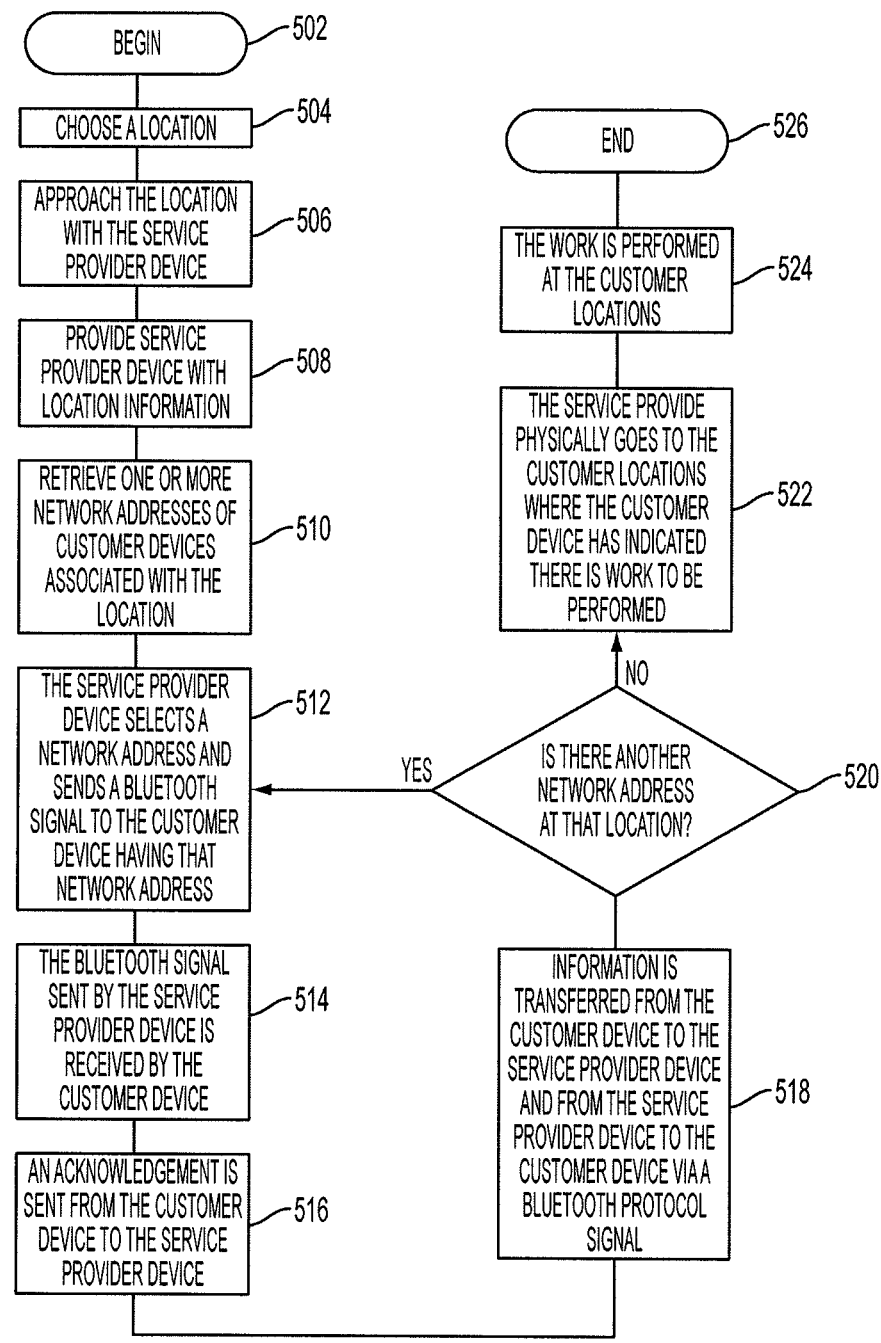
FIG. 5 is another flowchart describing an exemplary method of use of one or more embodiments of the system of the invention, wherein there are multiple customer devices at a location (e.g., an office building)
Figure 6:
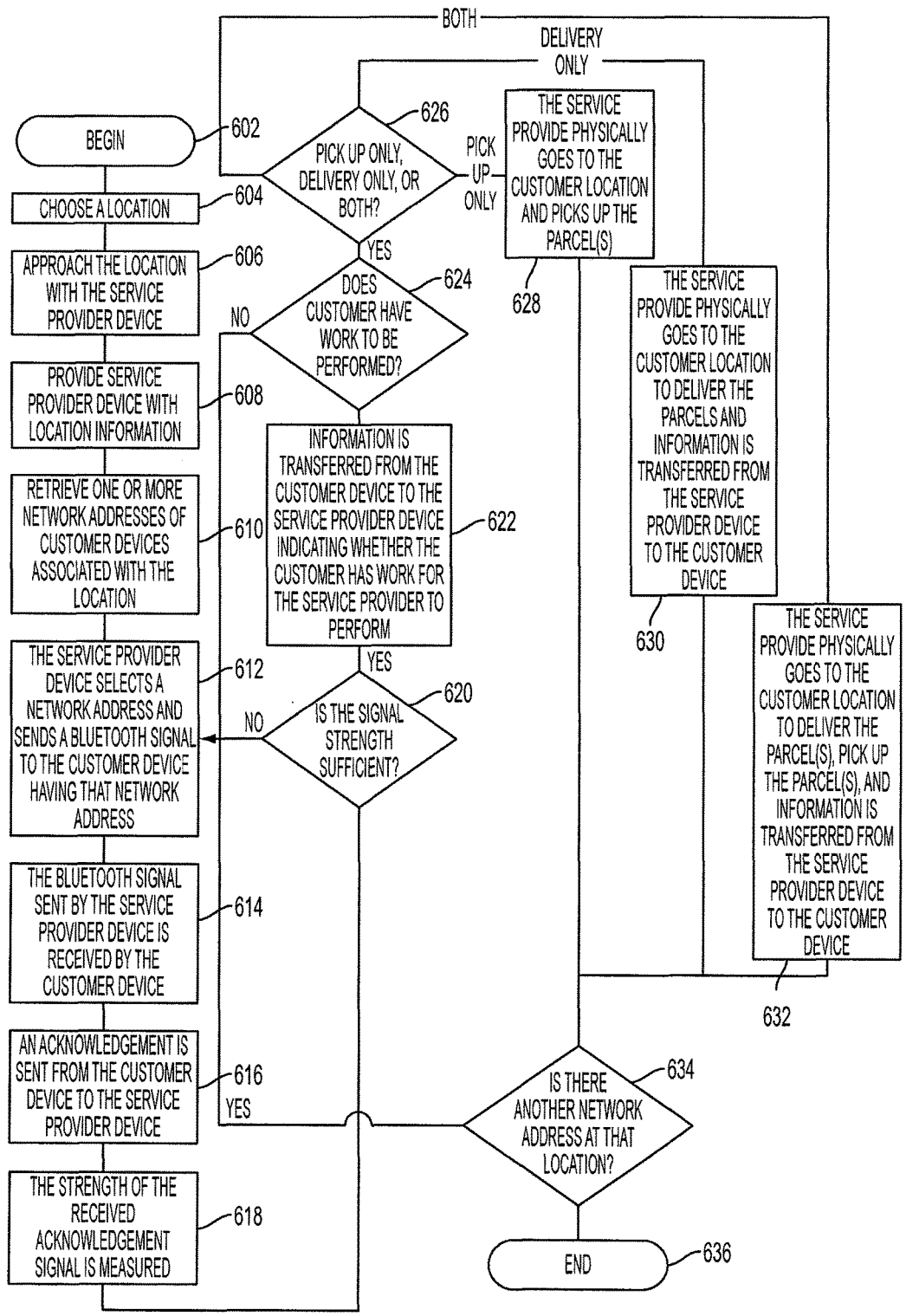
FIG. 6 is yet another flowchart describing an exemplary method of use of one or more embodiments of the system of the invention, wherein the signal strength between the customer device and the service provider device is determined before the transfer of information is initiated.

A method of use of the systems shown in FIGS. 1A, 1B and 2 include the steps described in the flowchart of FIG. 4. The process begins at Step 402. At Step 404, a service provider selects a location. At Step 406, the service provider nears the chosen location with a service provider device. At Step 408, the service provider device is provided with a description of the location such as, for example, an address, customer number, barcode, etc. At Step 410, the service provider device retrieves one or more unique addresses (e.g., MAC addresses) of customer devices at the chosen location. At Step 412, one of the unique addresses is chosen and the service provider device sends a wireless transmission such as, for example, a Bluetooth signal, that is addressed to the one or more unique addresses of that location. At Step 414, the customer device receives the wireless transmission from the service provider device. At Step 416, the customer device sends an acknowledgment in the form of a wireless transmission such as, for example, a Bluetooth signal to the service provider device. At Step 418, information is transferred from the service provider device to the customer device and from the customer device to the service provider device. Such information may include, for example, information about parcels to be picked up at the customer's office, information about parcels to be delivered at the customer's location, etc. At Step 420, the service provider will then physically go to the customer locations that have indicated that there is work to be done, while not going to the ones that have no work for the service provider. At Step 422, the work is performed at the customer's location, and the process ends at Step 424.

Another method of use begins at Step 502. At Step 504, a location, such as an office building, mall, etc., is chosen by a shipping service provider. At Step 506, the shipping service provider nears the chosen location with a service provider device. At Step 508, the shipping service provider's device is provided with a description of the location such as, for example, an address, customer number, barcode, a wireless signal having a coded address, an RFID tag with encoded address information, etc. At Step 510, the service provider device retrieves one or more unique addresses (e.g., MAC addresses) of customer devices at the chosen location. At Step 512, one of the unique addresses is chosen and the service provider device sends a Bluetooth signal that is addressed to the chosen unique addresses of that location. At Step 514, the customer device receives the Bluetooth transmission from the service provider device. At Step 516, the customer device sends an acknowledgment in the form of a Bluetooth signal to the service provider device. At Step 518, information is transferred from the customer device to the service provider device indicating that the customer has one or more parcels to be picked up at the customer's location by the shipping service provider. Such information may include, for example, information about parcels to be picked up at the customer's office, information about parcels to be delivered at the customer's location, etc. At Step 520, it is determined whether there is another unique address associated with that location. If so, the process returns to Step 512. If not, the process continues to Step 522. At Step 522, the shipping service provider will then physically go to the customer locations that have indicated that there is work to be done, while not going to the ones that have no work for the shipping service provider. At Step 524, the work is performed at the customer's location, and the process ends at Step 526.

Another method of use of the embodiments of the system begins at Step 602. At Step 604, a location, such as an office building, mall, etc., is chosen by a shipping service provider. At Step 606, the shipping service provider nears the chosen location with a service provider device. At Step 608, the shipping service provider's device is provided with a description of the location such as, for example, an address, customer number, barcode, a wireless signal having a coded address, an RFID tag with encoded address information, etc. At Step 610, the service provider device retrieves one or more unique addresses (e.g., MAC addresses) of customer devices at the chosen location. At Step 612, one of the unique addresses is chosen and the service provider device sends a Bluetooth signal that is addressed to the chosen unique address at that location. At Step 614, the customer device receives the Bluetooth transmission from the service provider device. At Step 616, the customer device sends an acknowledgment in the form of a Bluetooth signal to the service provider device. At Step 618, a DTR device in the service provider device measures the signal strength of the acknowledgement. At Step 620, it is determined whether the measured signal strength is sufficient to transmit information to and from the customer device. If the signal as measured in Step 620 is sufficient, then the process moves on to Step 622. If the signal is not sufficient to transmit information, then the process returns to Step 612. At Step 622, information is transferred from the customer device to the service provider device indicating whether the customer has work for the shipping service provider. At Step 624, it is determined whether the customer has work for the shipping service provider. If the customer does not have work, then the process returns to Step 612. If the customer does have work, then in Step 626 it is determined what type of work is to be performed. At Step 626, it is determined whether the customer has parcels to be picked-up, if the shipping service provider has parcels to be delivered to the customer, or both. If there are only items to be picked up at the customer's location, then in Step 628 the shipping service provider will travel to the customer's location to pick up the parcels. If there are only items to be delivered to the customer, then in Step 630 the service provider device will transfer information to the customer device about the items to be delivered and the service provider will deliver the items to the customer. If the customer has both, items to be picked up and items to be delivered, then in Step 632 the shipping service provider will take the items to be delivered to the customer's location, transfer information about the delivered items from the service provider's device to the customer's device, and pick up the items for shipment. At Step 634, it is determined whether there is another unique customer device address (e.g., MAC address) associated with that location. If so, the process returns to Step 612. If not, the process continues to Step 636, where it ends.

FIG. 7 is a flowchart illustrating an exemplary method for measuring the strength of a Bluetooth signal transmitted between two communications devices to determine if the devices are within data transmission range (DTR). The process begins at Step 702. At Step 704, a wireless communications signal is transmitted from a first Bluetooth™ enabled communications device to a second Bluetooth™ enabled communications device. At Step 706, the first wireless communications signal is received at the second Bluetooth™ enabled communications device. At Step 708, a DTR device at the second communications device measures the strength of the received wireless communications signal. At Step 710, it is determined whether the signal strength measured by the DTR device meets or exceeds a certain predetermined value. If it does meet or exceed the predetermined value, than at Step 712, wireless communications between the first communications device and the second communications device are enabled. If at Step 710 the measured signal strength does not meet or exceed the predetermined value, then the process returns to Step 704, above. The process ends at Step 714.

Another embodiment of an exemplary method for measuring the strength of a wireless signal transmitted between two Bluetooth™ enabled communications devices to determine if the devices are within data transmission range (DTR) is shown in the flowchart of FIG. 8. The process begins at Step 802. At Step 804, a wireless communications signal is transmitted from a first Bluetooth™ enabled communications device to a second Bluetooth™ enabled communications device. At Step 806, the first wireless communications signal is received at the second communications device. At Step 808, a second wireless communications signal is transmitted from the second communications device to the first communications device. The second wireless signal acknowledges the receipt of the first communications signal by the second communications device. At Step 810, the second communications signal is received at the first communications device and the strength of the second communications signal is measured with a DTR device. At Step 812, it is determined whether the measured signal strength meets or exceeds a predetermined value. If it meets or exceeds the predetermined value, than at Step 814 the wireless transmission of information between the first and second communications devices is enabled. If at Step 812, the measured signal strength does not meet or exceed the predetermined value, the process returns to Step 804, above. The process ends at Step 816.

All trademarks disclosed herein are the property of their respective owners. Use of such trademarks is only intended to indicate the source of particular goods or services and is not intended to constitute any advertising, sale, distribution, promotion, or offer for such work.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for determining whether a service provider needs to make a scheduled pickup of an item at a customer location comprising:
   detecting, via a mobile acquisition device, a geolocation comprising global positioning system (GPS) coordinates of a customer location;
   retrieving, via the mobile acquisition device, one or more network addresses that correspond to one or more customer computing devices associated with the detected geolocation of at the customer location;
   sending electronic communication signals to the one or more customer devices at the one or more network addresses in response to the mobile acquisition device being within a proximity of the detected geolocation of the customer location;
   establishing electronic communication with the one or more customer computing devices via the mobile acquisition device in response to (a) determining that a measured signal strength between the one or more customer computing devices and the mobile acquisition device equals or exceeds a predetermined threshold and (b) determining that the one or more customer computing devices at the customer location and the mobile acquisition device are within a proximity, of each other, corresponding to a data transmission range of the customer computing devices and the mobile acquisition device;
   autonomously receiving, via the mobile acquisition device, data from at least one of the one or more customer computing devices (i) indicating that a customer has an item to be picked up, for shipment by the service provider, at an address of the customer location, the data further indicating a location in which the item is to be shipped and a designated class, among a plurality of classes, identifying a priority of the shipment of the item, (ii) comprising information about an item for delivery to the customer location, and (iii) comprising information about the item to be picked up from the customer location in response to establishing electronic communication with the customer computing devices; and
   autonomously receiving, via the mobile acquisition device while the mobile acquisition device is at the customer location, data from at least one of the one or more customer computing devices, at the customer location, indicating that no items are to be picked up at another address of one or more other addresses of the customer location, and denoting to the service provider that the service provider does not need to visit the another address, in response to establishing electronic communication with the customer computing devices.

2. The method of claim 1, further comprising:
   causing a display on the mobile acquisition device of a plurality of location identifiers, wherein each location identifier (a) identifies the customer location and (b) is associated with one or more network addresses that correspond respectively to the one or more customer computing devices at the customer location.

3. The method of claim 2 further comprising:
   receiving a user input selecting the customer location.

4. The method of claim 1, wherein the mobile acquisition device is usable by an agent proximate to the customer location and at the customer location.

5. The method of claim 4, wherein establishing electronic communication with the one or more customer computing devices further comprises polling the one or more customer computing devices.

6. The method of claim 5 further comprising receiving an acknowledgement signal from the one or more customer computing devices in response to polling the one or more customer computing devices.

7. The method of claim 1 further comprising identifying at least a portion of a street address for the customer location associated with the detected geolocation.

8. The method of claim 1, wherein the one or more network address are Media Access Control (MAC) addresses.

9. The method of claim 1, further comprising:
   identifying, via the mobile acquisition device, at least a portion of a street address for the customer location associated with a location identifier identifying the customer location and which is associated with the one or more network addresses that correspond to the one or more customer computing devices at the customer location.

10. The method of claim 1, further comprising:
    autonomously receiving, via the mobile acquisition device while the mobile acquisition device is at the customer location, content from another customer computing device of the one or more customer computing devices, at the customer location, indicating at least one other item to be picked up at a different address of the other addresses of the customer location in response to establishing electronic communication with the another customer computing device of the one or more customer computing devices.

11. An apparatus comprising at least one processor and at least one memory including computer program code, the at least one memory and the computer program code configured to, with the processor, to cause the apparatus to at least:
    detect, via a mobile acquisition device, a geolocation comprising global positioning system (GPS) coordinates of a customer location;
    retrieve, via the mobile acquisition device, an associated one or more network addresses that correspond to one or more customer computing devices associated with the detected geolocation of the customer location;
    send electronic communication signals to the one or more customer devices at the one or more network addresses in response to the mobile acquisition device being within a proximity of the detected geolocation of the customer location;

establish electronic communication with the one or more customer computing devices in response to (a) determining that a measured signal strength between the one or more customer computing devices and the mobile acquisition device equals or exceeds a predetermined threshold and (b) determining that the one or more customer computing devices at the customer location and the mobile acquisition device are within a proximity, of each other, corresponding to a data transmission range of the one or more customer computing devices and the mobile acquisition device;

autonomously receive data from at least one of the one or more customer computing devices (i) indicating that a customer has an item to be picked up, for shipment by the service provider, at an address of the customer location, the data further indicating a location in which the item is to be shipped and a designated class, among a plurality of classes, identifying a priority of the shipment of the item, (ii) comprising information about an item for delivery to the customer location, and (iii) comprising information about the item to be picked up from the customer location in response to establishing electronic communication with the at least one of the one or more customer computing devices; and autonomously receive, in an instance in which the apparatus is at the customer location, data from at least one of the one or more customer computing devices, at the customer location, indicating that no items are to be picked up at another address of one or more other addresses of the customer location, and denoting to the service provider that the service provider does not need to visit the another address, in response to establishing electronic communication with the at least one of the one or more customer computing devices.

12. The apparatus of claim 11, wherein the memory and computer program code are further configured to, with the processor, cause the apparatus to:

display, via a display device, a plurality of location identifiers, wherein each location identifier (a) identifies the customer location and (b) is associated with one or more network addresses that correspond respectively to the one or more customer computing devices at the customer location.

13. The apparatus of claim 11, wherein the memory and computer program code are further configured to, with the processor, cause the apparatus to receive a user input selecting the customer location.

14. The computer system of claim 13, wherein the apparatus comprises the mobile acquisition device usable by an agent proximate to the customer location and at the customer location.

15. The apparatus of claim 11, wherein the memory and computer program code are further configured to, with the processor, cause the apparatus to:

poll the one or more customer computing device to establish electronic communication with the one or more customer computing device.

16. The apparatus of claim 15, wherein the memory and computer program code are further configured to, with the processor, cause the apparatus to:

receive an acknowledgement signal from the one or more customer computing device in response to polling the one or more customer computing device.

17. The apparatus of claim 11, wherein the memory and computer program code are further configured to, with the processor, cause the apparatus to:

identify at least a portion of a street address for the customer location associated with the detected geolocation.

18. The apparatus of claim 11, wherein the one or more network addresses are a Media Access Control (MAC) address.

19. The apparatus of claim 11, wherein the memory and computer program code are further configured to, with the processor, cause the apparatus to:

identify at least a portion of a street address for the customer location associated with a location identifier identifying the customer location and which is associated with the one or more network addresses that correspond to the one or more customer computing devices at the customer location.

20. The apparatus of claim 11, wherein the memory and computer program code are further configured to, with the processor, cause the apparatus to:

autonomously receive, in the instance in which the apparatus is at the customer location, content from another customer computing device of the one or more customer computing devices, at the customer location, indicating at least one other item to be picked up at a different address of the other addresses of the customer location in response to establishing electronic communication with the another customer computing device of the one or more customer computing devices.

* * * * *

UNITED STATES PATENT AND TRADEMARK OFFICE
CERTIFICATE OF CORRECTION

PATENT NO. : 10,318,912 B2
APPLICATION NO. : 13/188309
DATED : June 11, 2019
INVENTOR(S) : John A. Olsen et al.

Page 1 of 1

It is certified that error appears in the above-identified patent and that said Letters Patent is hereby corrected as shown below:

In the Claims

Column 13, Line 33: Please remove "of at" and replace with --of--.

Column 16, Line 1: Please remove "computer system" and replace with --apparatus--.

Signed and Sealed this
Thirteenth Day of August, 2019

Andrei Iancu
*Director of the United States Patent and Trademark Office*